United States Patent [19]

Ambalavanar

[11] Patent Number: 5,682,467
[45] Date of Patent: Oct. 28, 1997

[54] ARBITRATING APPARATUS FOR CONTROLLING SELECTIVE ACCESS OF MULTIPLE BUS MASTERS TO A PRINTING SYSTEM VIDEO BUS

[75] Inventor: Samuel D. Ambalavanar, Rochester, N.Y.

[73] Assignee: Xerox Corporation, Stamford, Conn.

[21] Appl. No.: 315,021

[22] Filed: Sep. 29, 1994

[51] Int. Cl.[6] .................................................... G06F 15/00
[52] U.S. Cl. ............................................................ 395/114
[58] Field of Search ................................. 395/100, 101, 395/109, 102, 114, 250, 294, 800, 291, 287, 290, 293, 295, 296, 299, 301, 308; 370/67, 85.1, 85.9, 124; 364/132, 143, 145

[56] References Cited

U.S. PATENT DOCUMENTS

| | | | |
|---|---|---|---|
| 3,597,071 | 8/1971 | Jones | 355/3 |
| 4,814,974 | 3/1989 | Narayanan et al. | 364/200 |
| 4,821,107 | 4/1989 | Naito et al. | 358/256 |
| 4,924,380 | 5/1990 | McKinney et al. | 364/200 |
| 4,953,081 | 8/1990 | Feal et al. | 364/200 |
| 5,021,892 | 6/1991 | Kita et al. | 358/468 |
| 5,047,955 | 9/1991 | Shope et al. | 364/519 |
| 5,113,494 | 5/1992 | Menedez et al. | 395/163 |
| 5,151,994 | 9/1992 | Wille et al. | 395/800 |
| 5,170,340 | 12/1992 | Prokop et al. | 364/143 |
| 5,175,633 | 12/1992 | Saito et al. | 358/406 |
| 5,223,948 | 6/1993 | Sakurai et al. | 358/404 |
| 5,261,047 | 11/1993 | Rivshin | 395/163 |
| 5,276,799 | 1/1994 | Rivshin | 395/162 |
| 5,301,262 | 4/1994 | Kashiwagi | 395/117 |
| 5,307,458 | 4/1994 | Freiburg et al. | 395/162 |

FOREIGN PATENT DOCUMENTS

| | | |
|---|---|---|
| 185370A1 | 6/1986 | European Pat. Off. . |
| 347763A2 | 12/1989 | European Pat. Off. . |
| 520837A2 | 12/1992 | European Pat. Off. . |
| 553374A1 | 8/1993 | European Pat. Off. . |
| 1531401 | 11/1978 | United Kingdom . |

*Primary Examiner*—Leo Boudreau
*Assistant Examiner*—Gabriel I. Garcia
*Attorney, Agent, or Firm*—Gary B. Cohen

[57] ABSTRACT

An arbitrating apparatus, having a filtering circuit operatively coupled with a bus grant circuit, is provided. In one example of operation, a plurality of bus request signals are transmitted simultaneously to the filtering circuit. The filtering circuit permits one of the bus request signals to pass to the bus grant circuit where the passed bus request signal is matched with a bus grant signal, which bus grant signal is used to obtain access to a video bus for one of a plurality of bus masters.

31 Claims, 11 Drawing Sheets

ARBITRATING APPARATUS FOR CONTROLLING SELECTIVE ACCESS OF MULTIPLE BUS MASTERS TO A PRINTING SYSTEM VIDEO BUS

CROSS REFERENCE TO RELATED PATENT

Cross reference is made to U.S. Pat. No. 5,579,452 Ambalavanar et al., the pertinent portions of which are incorporated herein by reference.

BACKGROUND OF THE INVENTION

The present invention relates generally to a technique for managing transfer of image data in a printing system and, more particularly, to an apparatus and method for arbitrating the order in which each of a plurality of masters is to access a bus when the plurality of masters seek access to the bus simultaneously.

Electronic printing systems typically include an input section, sometimes referred to as an input image terminal ("IIT"), a controller, sometimes referred to as an electronic subsystem ("ESS") and an output section or print engine, sometimes referred to as an image output terminal ("IOT"). In one type of electronic printing system, manufactured by Xerox® Corporation, known as the DocuTech® electronic printing system, a job can be inputted to the IIT from, among other sources, a network or a scanner. An example of an IIT with both network and scanner inputs is found in the following patent, the pertinent portions of which are incorporated herein by reference:

U.S. Pat. No. 5,170,340

Patentees: Prokop et al.

Issued: Dec. 8, 1992

When a scanner is employed to generate the job, image bearing documents are scanned so that the images therein are converted to image data for use in making prints. When a network is used to generate the job, a stream of data, including various job related instructions and image data, expressed in terms of a page description language is captured, decomposed and stored for printing. As is known, a network job can have its origin in a remote client, such as a workstation, or a print server with a storage device. Jobs provided at the IIT may be stored in a memory section, sometimes referred to as "electronic precollation memory". An example of electronic precollation memory may be found in the following patent:

U.S. Pat. No. 5,047,955

Patentees: Shope et al.

Issued: Sep. 10, 1991

U.S. Pat. No. 5,047,955 discloses a system in which input image data of a job is rasterized and compressed. The compressed, rasterized image data is then stored, in collated form, in a job image buffer. Once the job has been stored in the job image buffer, a selected number of job copies can be decompressed and printed without further job rasterization.

In one area related to electronic printing, namely digital copying, a demand for "multifunctionality" continues to grow. As illustrated by the following patent, a multifunctional digital copier can assume the form of an arrangement in which a single electrostatic processing printer is coupled with a plurality of different image input devices, with such devices being adapted to produce image related information for use by the printer.

U.S. Pat. No. 3,957,071

Patentee: Jones

Issued: Jul. 27, 1971

U.S. Pat. No. 3,957,071 discloses that the image related information, in one example, could have its origin in video facsimile signals, microfilm, data processing information, light scanning platens for full size documents, aperture cards and microfiche.

The following patents also relate to the area of multifunctional digital copying:

U.S. Pat. No. 4,821,107

Patentees: Naito et al.

Issued: Apr. 11, 1989

U.S. Pat. No. 5,021,892

Patentees: Kita et al.

Issued: Jun. 4, 1991

U.S. Pat. No. 5,175,633

Patentees: Saito et al.

Issued: Dec. 29, 1992

U.S. Pat. No. 5,223,948

Patentees: Sakurai et al.

Issued: Jun. 29, 1993

U.S. Pat. No. 5,276,799

Patentee: Rivshin

Jan. 4, 1994

U.S. Pat. No. 5,307,458

Patentees: Freiburg et al.

Issued: Apr. 26, 1994

U.S. Pat. No. 4,821,107 discloses a multifunctional image apparatus which is operable in one of various office automation modes, such as copy mode, facsimile mode, printer mode and the like. The multifunctional imaging apparatus is comprised of an image reading section, an image forming section and a communication section for transmitting and receiving image data.

U.S. Pat. No. 5,175,633 and U.S. Pat. No. 5,307,458, respectively, disclose systems that exploit a coprocessor to access, among others, facsimile and communication functions. In the latter of these patents, a plurality of input/output devices reside on a common bus with a video processor, with the video processor using an electronic precollation scheme. In the '458 patent, a first set of image data is processed in the video processor while a second set of image data is buffered in the coprocessor. An arbiter permits the coprocessor to have the bus, for a selected interval, to process the second set of image data in the video processor.

U.S. Pat. No. 5,276,799 discloses a multi-bus printing system in which multiple tasks can be performed at any one moment in time. More particularly, a group of intelligent modules is in communication with a CBus, DBus and VBus, respectively, while a CPU processing module is in communication with the CBus and a DMA processing module is in communication with the DBus. One feature of this multi-bus printing system is that it provides a high level of concurrency. For example, in one embodiment three separate sets of data can be substantially concurrently transferred across the CBus, DBus and VBus.

Digital copiers typically seek to optimize concurrency and/or multi-tasking in operation. Xerox' DocuTech® optimizes multitasking by using a plurality of processors to operate individual services, such as scanning, printing, storing and decomposing, simultaneously. Accordingly, in one example, a document can be scanned while another document is being printed. Even though this sort of multitasking is desirable, it requires a substantial amount of both processing capability and storage space. A printing system, with an architecture of substantially smaller scale than DocuTech®, may be found in the following patent:

British Patent 1,531,401

Patentees: Davy et al.

Publication Date of Complete Specification: Nov. 8, 1976

British Patent 1,531,401 discloses a system with a bus to which an input section, precollation memory and an output section are operatively coupled. Each of the input section and the output section includes a set of buffers and a direct memory access (DMA) interface. One DMA interface serves to transfer a first set of buffered data from one of the input buffers to the precollation memory while another DMA interface serves to transfer a second set of data from the precollation memory to one of the output buffers. Another patent that uses an architectural concept similar to that of the '401 British patent can be found in the following reference:

U.S. Pat. No. 5,301,262

Patentee: Kashiwagi

Issued: Apr. 5, 1994

The '262 patent, in contrast to the '401 British patent, compresses image data, prior to storing it in a page buffer, and decompresses the image data, prior to outputting it.

In any system employing a plurality of bus masters, such as storage and input/output devices, coupled to a bus, arbitration is, for all intents and purposes, essential in order to maintain orderly access of the bus masters to the bus. Indeed, in the area of both computer architecture and printing system architecture, the use of arbiters is well known. The following patents relate to the use of arbiters in a computer context:

U.S. Pat. No. 4,814,974

Patentees: Narayanan et al

Issued: Mar. 21, 1989

U.S. Pat. No. 4,924,380

Patentees: McKinney et al.

Issued: May 8, 1990

U.S. Pat. No. 4,953,081

Patentees: Feal et al.

Issued: Aug. 28, 1990

U.S. Pat. No. 5,151,994

Patentees: Wille et al.

Issued: Sep. 29, 1992

U.S. Pat. No. 4,814,974 discloses a system with a plurality of bus masters communicating with both a bus and an arbitrator. A request signal is transmitted from one of the bus masters to the arbitrator when the bus master seeks to access the bus. When the arbitrator determines that the bus master can access the bus, a grant signal, which permits the bus master to access the bus, is transmitted to the bus master. The arbitrator includes a permutation network coupled with a priority designator. The priority designator includes a programmable memory having addressable locations, each of which comprises a plurality of storage segments wherein each storage segment of a location permanently corresponds with a unique priority level different from priority levels of the other storage segments at the location and stores information identifying the device having the corresponding priority level in defining an order of priority defined by that location. The priority designator further includes an addressing arrangement coupled to the memory for cyclically addressing each addressable location. The permutation network transmits prioritized requests to a priority encoder where the highest priority request line is designated for encoding. A device number selector, which communicates with the priority encoder and the priority designator, generates an output which corresponds to the device associated with the encoded request line. A decoder, which is coupled with the device number selector, responds to the priority device number input from the device number selector by asserting the grant line of the device to be granted access to the bus.

U.S. Pat. No. 4,924,380 relates to a multiprocessor system with a common bus, a plurality of system agents, a bus, common to the system agents and a central arbitration controller. In practice, the central arbitration controller samples the request status of every system agent and grants bus accesses based on an arbitration scheme consisting of two rotating queues with a fixed priority between the queues.

U.S. Pat. No. 4,953,081 is directed toward a data bus system, linking a plurality of users, in which user access to the bus is provided by an arbiter responding to a plurality of user requests for bus access by employing an adjustable priority scheme for granting access. When a user has access to the bus, the arbiter updates user priority by assigning the lowest priority to the current user and upwardly adjusting the priorities of all currently-requesting users.

The following patents relate to the use of arbiters in a printing system context:

U.S. Pat. No. 5,113,494

Patentees: Menendez et al.

Issued: May 12, 1992

U.S. Pat. No. 5,261,047

Patentee: Rivshin

Issued: Nov. 9, 1993

U.S. Pat. No. 5,113,494 is directed toward a pipe-lined image processing system including an arbiter coupled with a bus. The arbiter, which typically assumes the form of a processor, receives a request, from any one of a plurality of image processing components (the source component), for service, from another one of the plurality of image processing components (the destination component). Then, depending upon the availability of the bus and the destination component, the arbiter defines a data path over the bus between the source and destination components, and thereafter initiates an information (typically data) transfer over the bus and between these components.

U.S. Pat. No. 5,261,047 discloses a printing system in which a plurality of bus masters are coupled with both a data bus and an image bus arbiter. The image bus arbiter, which assumes the form of a programmable logic array, operates as a state machine in which two of the bus masters are assigned a fixed priority and two other bus masters are assigned a rotating priority.

The above-mentioned arbiters represent a full range of both performance capability and flexibility. In particular, arbiters of various ones of the above-mentioned references are unable to resolve bus priority within a single clock cycle. This is evidenced, in U.S. Pat. No. 4,924,081 and U.S. Pat. No. 4,953,081, by the necessity to latch bus request signals. Even though the processor of U.S. Pat. No. 5,113,494 could probably resolve priority in one clock cycle, it is costly and inefficient to use a processor to perform arbitration. Additionally, while the arbiters of U.S. Pat. No. 5,151,994 U.S. Pat. No. 5,261,047 and U.S. Pat. No. 5,307,458 are believed to resolve priority relatively quickly, they lack the complexity of design which would make them well suited for handling many bus masters in a programmable fashion. While the arbiter of U.S. Pat. No. 4,814,974 appears to be well suited for its intended purpose, it is not necessarily cost efficient for use in an environment that requires minimization of unit machine cost (UMC), such as a printing system environment. In particular, the arbiter of the '974 patent can require a substantial amount of memory. Indeed, as indicated in the '974 patent, the memory "may be distributed among several memory modules." Additionally, when optimizing UMC, it is desirable to integrate an arbiter design into a chip, in the form of an ASIC. Using a substantial amount of memory, as disclosed by the '974 patent, however, can create difficulties in designing an arbiter ASIC. It would be desirable to provide a highly functional arbiter that is efficient, compact and cost effective.

The pertinent portions of all the above-discussed references are incorporated herein by reference.

SUMMARY OF THE INVENTION

In accordance with one aspect of the present invention there is provided an arbitrating apparatus for controlling which one of a first bus master and a second bus master accesses a video bus when the first bus master, by way of a first bus request signal transmitted by the first bus master, and the second bus master, by way of a second bus request signal transmitted by the second bus master, seek access to the video bus simultaneously, comprising: a first bus and a second bus for respectively transmitting the first bus request signal and the second bus request signal thereacross; a filtering circuit, operatively coupled with said first bus and said second bus, said filtering circuit permitting only a selected one of the first bus request signal and the second bus request signal to pass therethrough; a bus grant circuit, operatively coupled with said filtering circuit, for issuing a first bus grant signal, when receiving the first bus request signal, or a second bus grant signal, when receiving the second bus request signal, the first bus grant signal being used to obtain access to the video bus for the first bus master and the second bus grant signal being used to obtain access to the video bus for the second bus master.

These and other aspects of the invention will become apparent from the following description, the description being used to illustrate a preferred embodiment of the invention when read in conjunction with the accompanying drawings.

DESCRIPTION OF THE PREFERRED EMBODIMENT(S)

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
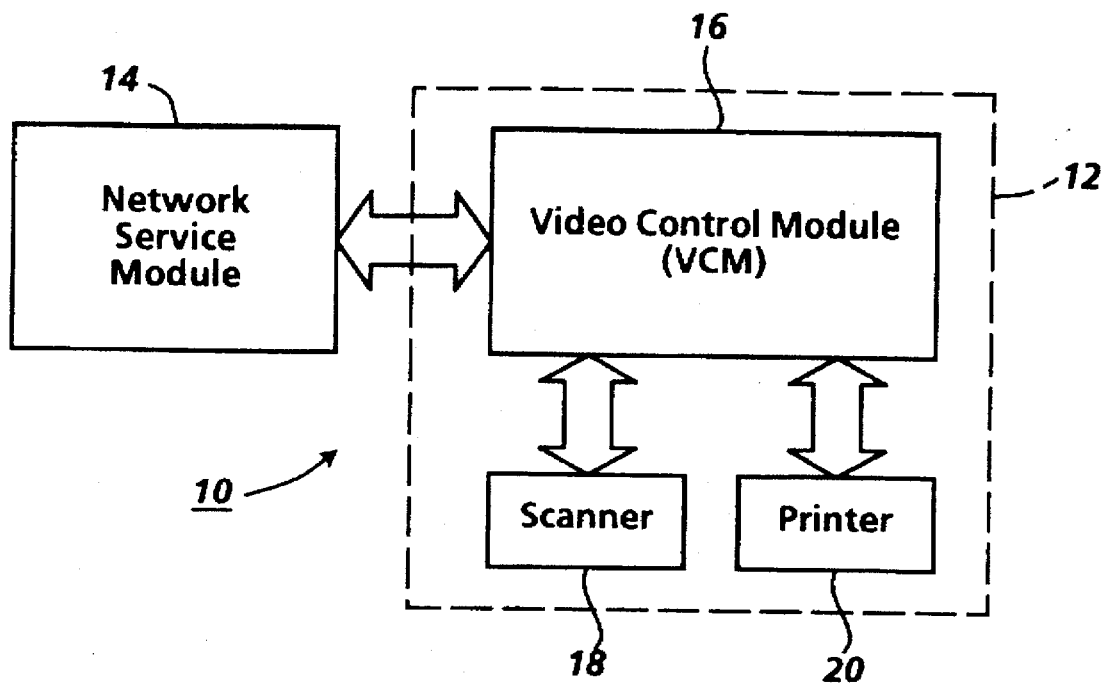
FIG. 1 is a block diagram depicting a multifunctional, network adaptive printing machine.

Referring to FIG. 1, a multifunctional, network adaptive printing system is designated by the numeral 10. The printing system 10 includes a printing machine 12 operatively coupled with a network service module 14. The printing machine 12 includes an electronic subsystem 16, referred to as a video control module (VCM), communicating with a scanner 18 and a printer 20. In one example, the VCM 16, which will be described in further detail below, coordinates the operation of the scanner and printer in a digital copying arrangement. In a digital copying arrangement, the scanner 18 (also referred to as image input terminal (IIT)) reads an image on an original document by using a CCD full width array and converts analog video signals, as gathered, into digital signals. In turn, an image processing system 22 (FIG. 2), associated with the scanner 18, executes signal correction and the like, converts the corrected signals into multi-level signals (e.g. binary signals), compresses the multi-level signals and preferably stores the same in electronic precollation (EPC) memory 24.

Referring again to FIG. 1, the printer 20 (also referred to as image output terminal (IOT)) preferably includes a xerographic print engine. In one example, the print engine has a multi-pitch belt (not shown) which is written on with an imaging source, such as a synchronous source (e.g. laser raster output scanning device) or an asynchronous source (e.g. LED print bar). In a printing context, the multi-level image data is read out of the EPC memory 24 (FIG. 2) while the imaging source is turned on and off, in accordance with the image data, forming a latent image on the photoreceptor. In turn, the latent image is developed with, for example, a hybrid jumping development technique and transferred to a print media sheet. Upon fusing the resulting print, it may be inverted for duplexing or simply outputted. It will be appreciated by those skilled in the art that the printer can assume other forms besides a xerographic print engine without altering the concept upon which the disclosed embodiment is based. For example, the printing system 10 could be implemented with a thermal ink jet or ionographic printer.

Figure 2:
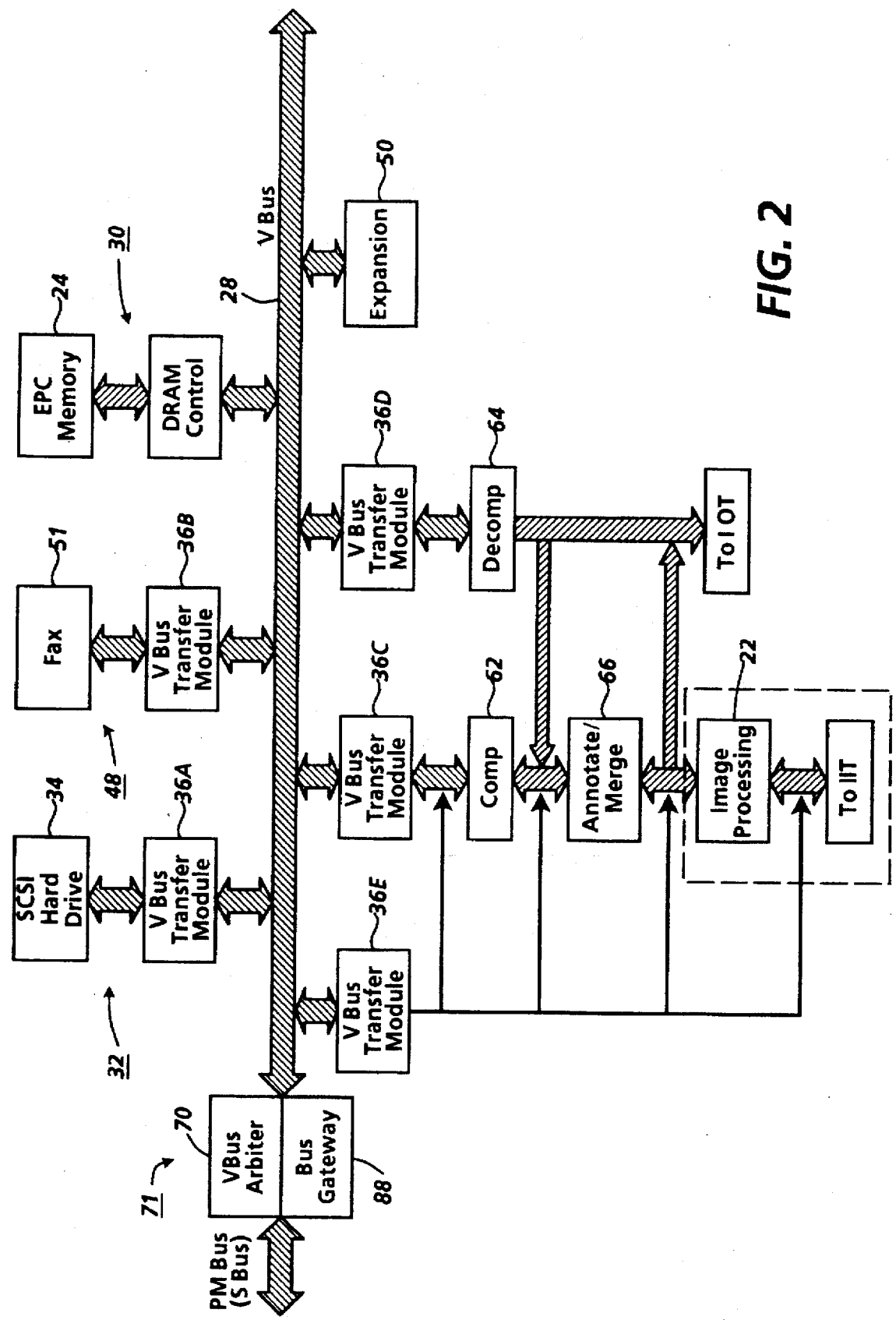
FIG. 2 is a block diagram of a video control module for the printing machine of FIG. 1.

Referring specifically to FIG. 2, the VCM 16 is discussed in further detail. The VCM 16 includes a video bus (VBus) 28 with which various I/O, data transfer and storage components communicate. Preferably, the VBus is a high speed, 32 bit data burst transfer bus which is expandable to 64 bit. The 32 bit implementation has a sustainable maximum bandwidth of approximately 60 MBytes/sec. In one example, the bandwidth of the VBus is as high as 100 MBytes/sec.

The storage components of the VCM reside in the EPC memory section 30 and the mass memory section 32. The EPC memory section includes the EPC memory 24, the EPC memory being coupled with the VBus by way of a DRAM controller 33. The EPC memory, which is preferably DRAM, provides expansion of up to 64 MBytes, by way of two high density 32 bit SIMM modules. The mass memory section 32 includes a SCSI hard drive device 34 coupled to the VBus by way of a transfer module 36a. As will appear, other I/O and processing components are coupled respectively to the VBus by way of transfer modules 36. It will be appreciated that other devices (e.g. a workstation) could be coupled to the VBus by way the transfer module 36a through use of a suitable interface and a SCSI line.

Figure 3:
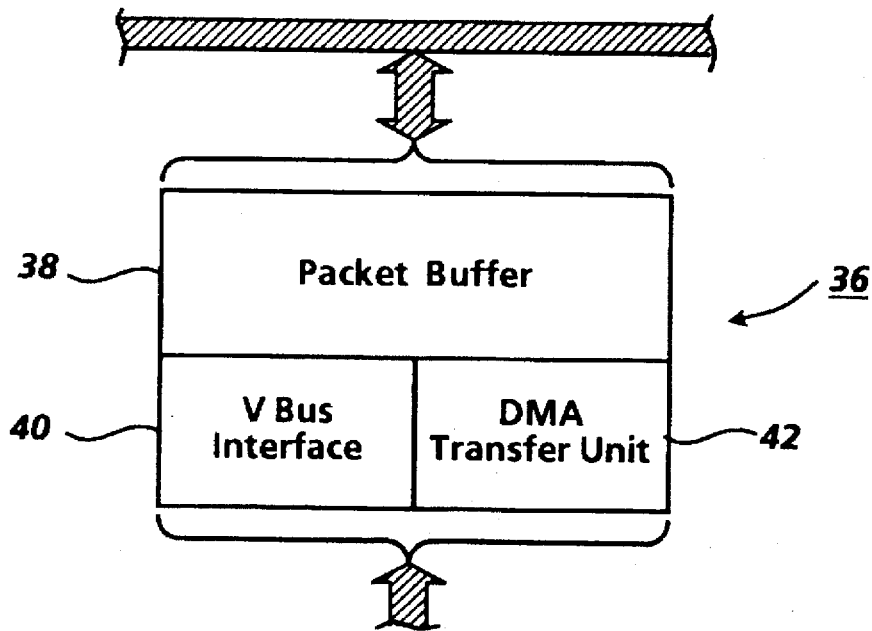
FIG. 3 is a block diagram of a transfer module used in conjunction with the printing machine of FIG. 2.

Referring to FIG. 3, the structure of one of the transfer modules 36 is discussed in further detail. The illustrated transfer module of FIG. 3 includes a packet buffer 38, a VBus interface 40 and DMA transfer unit 42. The transfer module 36, which was designed with "VHSIC" Hardware Description Language (VHDL), is a programmable arrangement permitting packets of image data to be transmitted along the VBus at a relatively high transfer rate. In particular, the packet buffer is programmable so that the segment or packet can be varied according to the available bandwidth of the VBus. In one example, the packet buffer can programmed to handle packets of up to 64 Bytes. Preferably, the packet size would be reduced for times when the VBus is relatively busy and increased for times when activity on the bus is relatively low.

Figure 5:
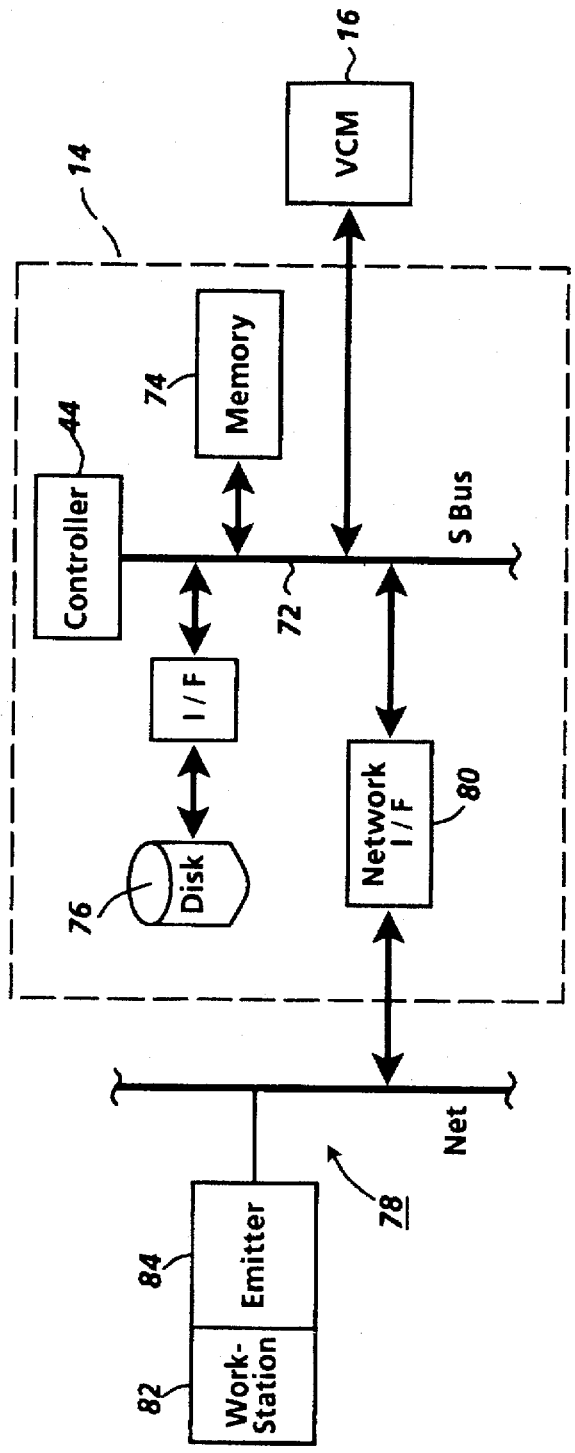
FIG. 5 is a block diagram of a network controller for the printing machine of FIG. 1.

Adjustment of the packet size is achieved with the VBus interface 40 and a system controller 44 (FIG. 5). Essentially, the VBus interface is an arrangement of logical components, including, among others, address counters, decoders and state machines, which provides the transfer module with a selected degree of intelligence. The interface 40 communicates with the system controller to keep track of desired packet size and, in turn, this knowledge is used to adjust the packet size of the packet buffer 38, in accordance with bus conditions. That is, the controller, in view of its knowledge regarding conditions on the VBus 28, passes directives to the interface 40 so that the interface can adjust packet size accordingly. Further discussion regarding operation of the transfer module 36 is provided below.

The DMA transfer unit employs a conventional DMA transfer strategy to transfer the packets. In other words, the beginning and end addresses of the packet are used by the transfer unit in implementing a given transfer. When a transfer is complete, the interface 40 transmits a signal back to the system controller 44 so that further information, such as desired packet size and address designations, can be obtained.

Figure 4:
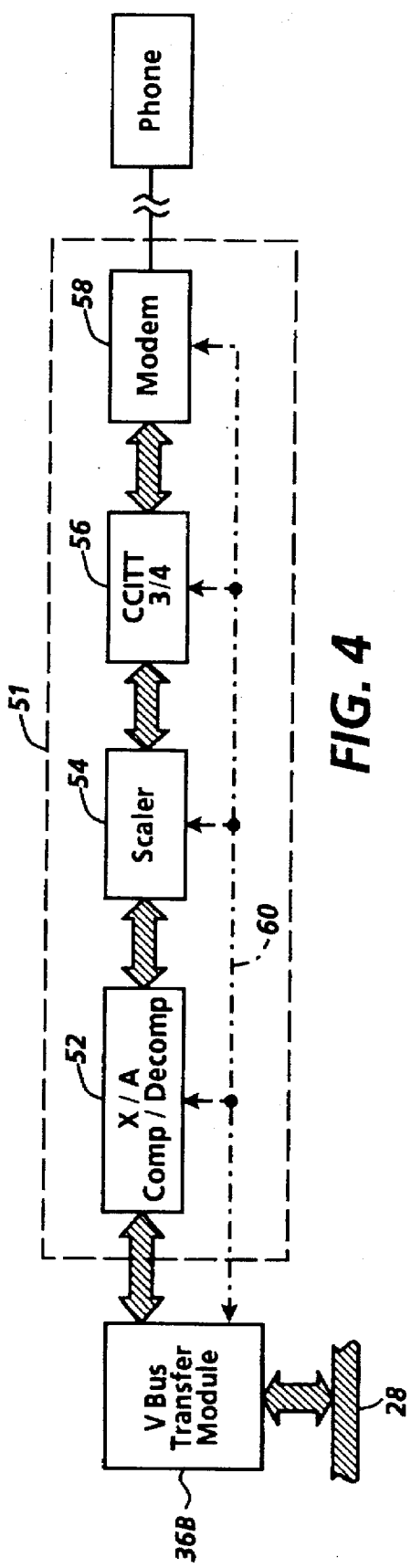
FIG. 4 is a block diagram of a facsimile card used in conjunction with the printing machine of FIG. 2.

Referring to FIGS. 1 and 2, three I/O components are shown as being coupled operatively to the VBus 28, namely a FAX module 48, the scanner or IIT 18, and the printer or IOT 20; however, it should be recognized that a wide variety of components could be coupled to the VBus by way an expansion slot 50. Referring to FIG. 4, an implementation for the FAX module, which is coupled to the VBus 28 by way of transfer module 36b, is discussed in further detail. In the preferred embodiment, a facsimile device (FAX) 51 includes a chain of components, namely a section 52 for performing Xerox adaptive compression/decompression, a section 54 for scaling compressed image data, a section 56 for converting compressed image data to or from CCITT format, and a modem 58, preferably manufactured by Rockwell Corporation, for transmitting CCITT formatted data from or to a telephone, by way of a conventional communication line.

Referring still to FIG. 4, each of the sections 52, 54 and 56 as well as modem 58 are coupled with the transfer module 36b by way of a control line 60. This permits transfers to be made to and from the FAX module 48 without involving a processor. As should be understood, the transfer module 36b can serve as a master or slave for the FAX module in that the transfer module can provide image data to the FAX for purposes of transmission or receive an incoming FAX. In operation, the transfer module 36b reacts to the FAX module in the same manner that it would react to any other I/O component. For example, to transmit a FAX job, the transfer module 36b feeds packets to the section 52 through use of the DMA transfer unit 42 and, once a packet is fed, the transfer module transmits an interrupt signal to the system processor 44 requesting another packet. In one embodiment, two packets are maintained in the packet buffer 38 so that "ping-ponging" can occur between the two packets. In this way, the transfer module 36b does not run out of image data even when the controller cannot get back to it immediately upon receiving an interrupt signal.

Referring again to FIG. 2, the IIT 18 and IOT 20 are operatively coupled to the VBus 28 by of transfer modules 36c and 36d. Additionally, the IIT 18 and the IOT 20 are operatively coupled with a compressor 62 and a decompressor 64, respectively. The compressor and decompressor are preferably provided by way of a single module that employs Xerox adaptive compression devices. Xerox adaptive compression devices have been used for compression/decompression operations by Xerox Corporation in its DocuTech® printing system. In practice, at least some of the functionality of the transfer modules is provided by way of a 3 channel DVMA device, which device provides local arbitration for the compression/decompression module.

As further illustrated by FIG. 2, the scanner 18, which includes the image processing section 22, is coupled with an annotate/merge module 66. Preferably the image processing section includes one or more dedicated processors programmed to perform various desired functions, such as image enhancement, thresholding/screening, rotation, resolution conversion and TRC adjustment. The selective activation of each of these functions can be coordinated by a group of image processing control registers, the registers being programmed by the system controller 44. Preferably, the functions are arranged along a "pipeline" in which image data is inputted to one end of the pipe, and image processed image data is outputted at the other end of the pipe. To facilitate throughput, transfer module 36e is positioned at one end of the image processing section 22 and transfer module 36c is positioned at another end of the section 22. As will appear, positioning of transfer modules 36c and 36e in this manner greatly facilitates the concurrency of a loopback process.

Referring still to FIG. 2, arbitration of the various bus masters of the VCM 16 is implemented by way of a VBus arbiter 70 disposed in a VBus arbiter/bus gateway 71. The arbiter determines which bus master (e.g. FAX module, Scanner, Printer, SCSI Hard Drive, EPC Memory or Network Service Component) can access the VBus at one given time. The arbiter is made up of two main sections and a third control section. The first section, i.e., the "Hi-Pass" section, receives input bus requests and current priority selection, and outputs a grant corresponding to the highest priority request pending. The current priority selection input is the output from the second section of the arbiter and is referred to as "Priority Select". This section implements priority rotation and selection algorithm. At any given moment, the output of the logic for priority select determines the order in which pending requests will be serviced. The input to Priority Select is a register which holds an initial placement of devices on a priority chain. On servicing requests, this logic moves the devices up and down the priority chain thereby selecting the position of a device's next request. Control logic synchronizes the tasks of the Hi-Pass and the Priority Select by monitoring signals regarding request/grant activity. It also prevents the possibility of race conditions.

Referring to FIG. 5, the network service module 14 is discussed in further detail. As will be recognized by those skilled in the art, the architecture of the network service module is similar to that of a known "PC clone". More particularly, in the preferred embodiment, the controller 44, which preferably assumes the form of a SPARC processor, manufactured by Sun Microsystems, Inc., is coupled with a standard SBus 72. In the illustrated embodiment of FIG. 5, a host memory 74, which preferably assumes the form of DRAM, and a SCSI disk drive device 76 are coupled operatively to the SBus 72. While not shown in FIG. 5, a storage or I/O device could be coupled with the SBus with a suitable interface chip. As further shown in FIG. 5, the SBus is coupled with a network 78 by way of an appropriate network interface 80. In one example, the network interface includes all of the hardware and software necessary to relate the hardware/software components of the controller 44 with the hardware/software components of the network 78. For instance, to interface various protocols between the network service module 14 and the network 78, the network interface could be provided with, among other software, Netware® from Novell Corp.

In one example, the network 78 includes a client, such as a workstation 82 with an emitter or driver 84. In operation, a user may generate a job including a plurality of electronic pages and a set of processing instructions. In turn, the job is converted, with the emitter, into a representation written in a page description language, such as PostScript. The job is then transmitted to the controller 44 where it is interpreted with a decomposer, such as one provided by Adobe Corporation. Some of the principles underlying the concept of interpreting a PDL job are provided in U.S. application Ser. No. 07/898,761 entitled "Apparatus and Method for Multi-Stage/Multi-Process Decomposing", filed on Jun. 12, 1992, by Bonk et al., and U.S. Pat. No. 5,226,112 to Mensing et al., the pertinent portions of both references being incorporated herein by reference. Further details regarding a technique for generating a job in a PDL may be obtained by reference to the following text, the pertinent portions of which are incorporated herein by reference:

PostScript® Language Reference Manual

Second Edition

Addison-Wesley Publishing Co.

1990

Referring again to FIG. 2, the network service module 14 is coupled with the VCM 16 via a bus gateway 88 of the VBus arbiter/bus gateway 71. In one example, the bus gateway comprises a field programmable gate array provided by XILINX corporation. The bus gateway device provides the interface between the host SBus and the VCM VBus. It provides VBus address translation for accesses to address spaces in the VBus real address range, and passes a virtual address to the host SBus for virtual addresses in the host address range. A DMA channel for memory to memory transfers is also implemented in the bus gateway. Among other things, the bus gateway provides seamless access between the VBus and SBus, and decodes virtual addresses from bus masters, such as one of the transfer modules 36, so that an identifier can be obtained from a corresponding slave component. It will be appreciated by those skilled in the art that many components of the printing system 10 are implemented in the form of a single ASIC.

Referring to FIGS. 2, 3 and 5, further discussion regarding DMA transfer of each of the transfer modules 36 is provided. In particular, in one example, the images of a job are stored in the host memory 74 as a series of blocks. Preferably, each block comprises a plurality of packets. In operation, one of the transfer modules 36 is provided, by the controller 44, with the beginning address of a block and the size of the block. In turn, for that block, the transfer module 36 effects a packet tranfer and increments/decrements a counter. This procedure is repeated for each packet of the block until the interface 40 determines, by reference to the counter, that the last packet of the block has been transferred. Typically, for each stored image, several blocks are transferred, in a packet-by-packet manner, as described immediately above.

Referring to FIGS. 2, and 5–7, one aspect of operation of the above described printing system is discussed. In particular, FIGS. 6 and 7 relate to an advantageous manner in which the transfer modules 36 are employed to facilitate a loopback approach for image processing of jobs which are captured at a location other than the scanner 18. In the illustrated embodiment of FIG. 6, a job is captured in the network service module 14 (step 90). This is not to imply, however, that the loopback operation could not be performed, with equal facility, on a job captured at another location, such as the FAX module 48. Upon capturing the network job, it is either spooled in, for example, the SCSI disk 76 for eventual decomposition (steps 92, 94) or decomposed with the controller 44 for storage in the host memory 74 (steps 92, 96). If the process branches to step 94, a return is encountered. Accordingly, functions are performed, relative to other jobs, until the system is ready to decompose the spooled job. When it is time to decompose the spooled job, processing of the spooled job will resume at step 96.

Assuming that the job is decomposed, and image processing is required by the job, one or more transfer modules 36 are programmed, via step 98, for transferring electronic pages of the job to one or more destinations. It should be appreciated that, in one example, it may be desirable to program transfer module 36e for transferring an electronic page to the image processing section 22 and to program transfer module 36c for transferring the resulting image processed electronic page to EPC memory 24. It will be appreciated that other ones of the transfer modules could be programmed in a manner that would enhance system concurrency. For example, in the case where the image processed electronic page is transferred to EPC memory, the transfer module 36a could be programmed to spool a copy of the image processed electronic page in the SCSI disk 34.

At step 100, it is determined whether a current electronic page requires image processing. Initially, this determination would be made for a first page of the job. Assuming that the current electronic page does not require image processing, it is determined, at step 102, whether the current electronic page is to be transferred to a location other than the host memory 74. In one example, it may be desired to transfer the electronic page to the EPC memory 24 for eventual output (at, for example, the printer 20 or the facsimile device 51) or storage (in the SCSI disk 34). If the current page is to be transferred, then step 104 is executed, otherwise, the process proceeds to step 106 (FIG. 7) so that further electronic pages can be, if necessary, image processed and/or transferred (step 107).

Assuming that the current electronic page is to be image processed (FIG. 6), the image processing section 22 is set up, via step 108, to perform one or more selected image processing operations on a selected electronic page. In response to setting up appropriate image processing control registers, at step 108, the current electronic page is transferred, with the transfer module 36e, to the image processing section 22 (step 110) and, at step 112, one or more programmed image processing operations are performed on the current electronic page. Upon completion of the image processing operations, it is determined, at step 114, whether the image processed electronic page should be transferred to storage (e.g. EPC memory 24 or host memory 74) or an output device (e.g. printer 20 or FAX module 48).

If the current electronic page is to be stored, then a decision is made, at step 118 (FIG. 7), as to whether the current electronic page is to be stored. For the most part, the printing system compresses the current electronic page, to promote efficient storage, unless a print of the current electronic page is to be produced. Indeed, even when printing a job, the corresponding electronic pages are often compressed and then stored in the EPC memory for "print readiness". With this approach a selected number of job copies can be printed without capturing/processing the job more than once. In some instances, however, it may be desirable to produce a single print from a current electronic job. For example, a single print may be produced for purposes of proofing. If compression is required, then the current electronic page is passed to the compressor 62, at step 120, otherwise, a storage destination of the current electronic page is determined directly, at step 122.

Figure 6:
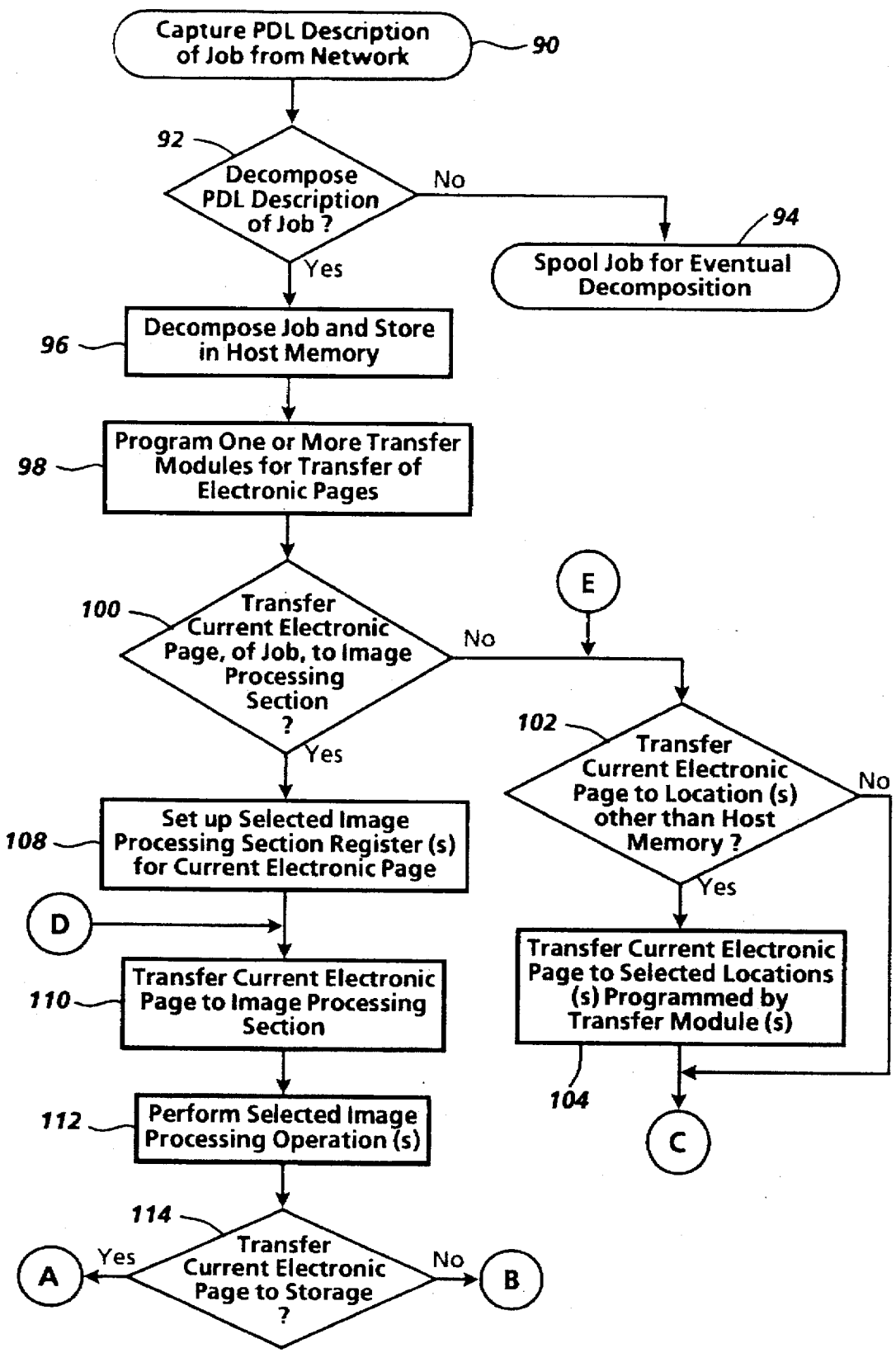
FIGS. 6 and 7 represent a flow diagram for a loopback image processing method of the present invention.
Figure 7:
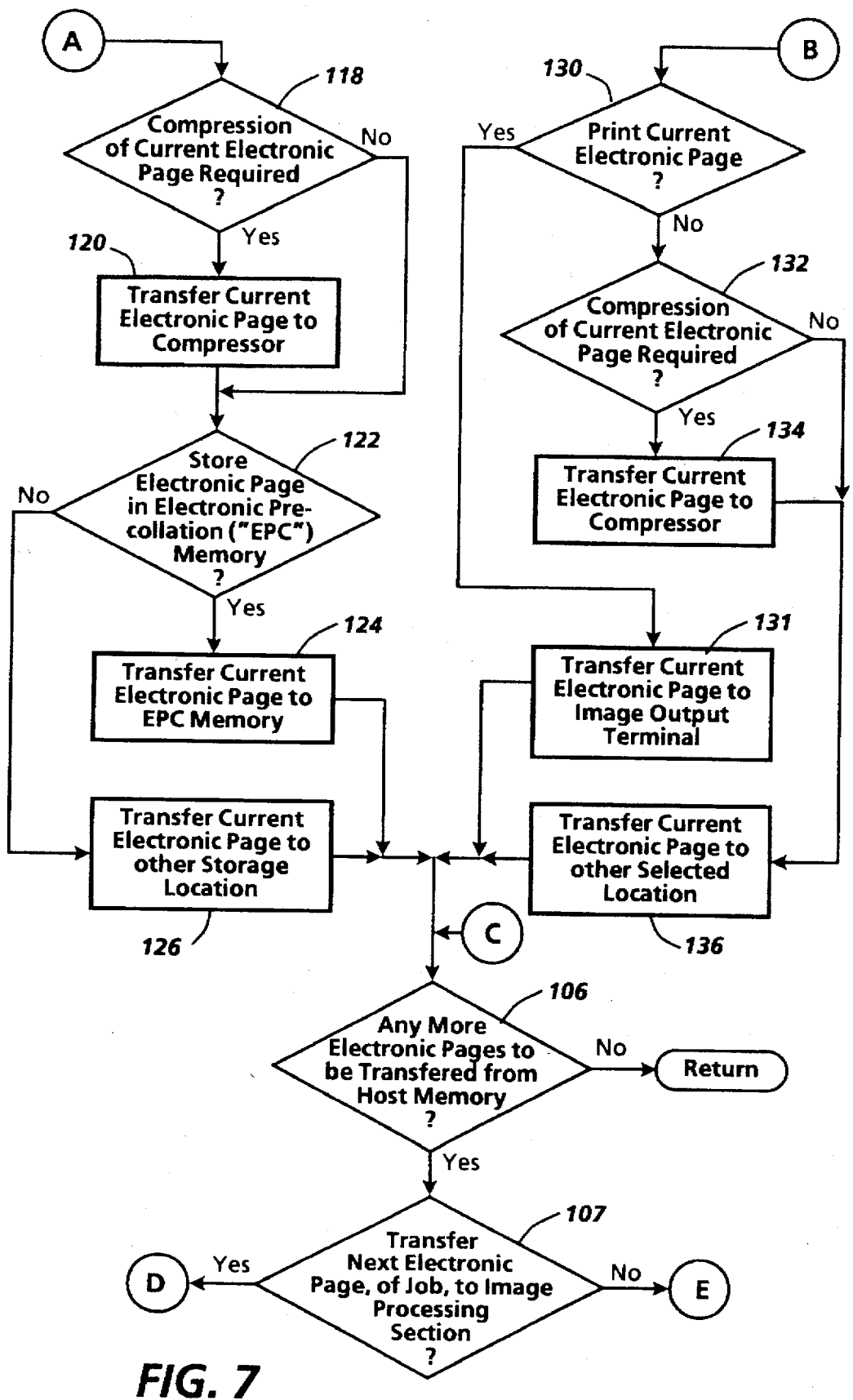

If the decision at step 122 is in the positive, then the process proceeds to step 124, where the current electronic page is transferred to the EPC memory, and then to step 106, where a check is made to determine if any more electronic pages exist, for the job, in the host memory 74. If the decision at step 122 is in the negative, then the current electronic page is transferred to a designated storage location other than the EPC memory (step 126), such as the host memory 74, and the process proceeds to step 106. Assuming that the current electronic page is not going to be stored, it is determined, at step 130, whether the current electronic page is to be printed. If the current electronic page is to be printed, then the same is transferred to the printer 20 for marking (step 131), otherwise, it is determined, at step 132, whether the current electronic page is to be compressed. As mentioned above, if an electronic page is not printed, then, typically, it is compressed. Assuming compression is required, the process proceeds to step 134, otherwise a transfer of the current electronic page to another location is performed directly at step 136. In either case, the process proceeds eventually to step 106. If all of the electronic pages in the host memory have been read, then the routine of FIGS. 6 and 7 is ended through a return. If, on the other hand, more pages need be transferred, then the process proceeds to step 107 where a next current electronic page is either processed or, if necessary, transferred away from host memory to another storage location or an output device.

Figure 8:
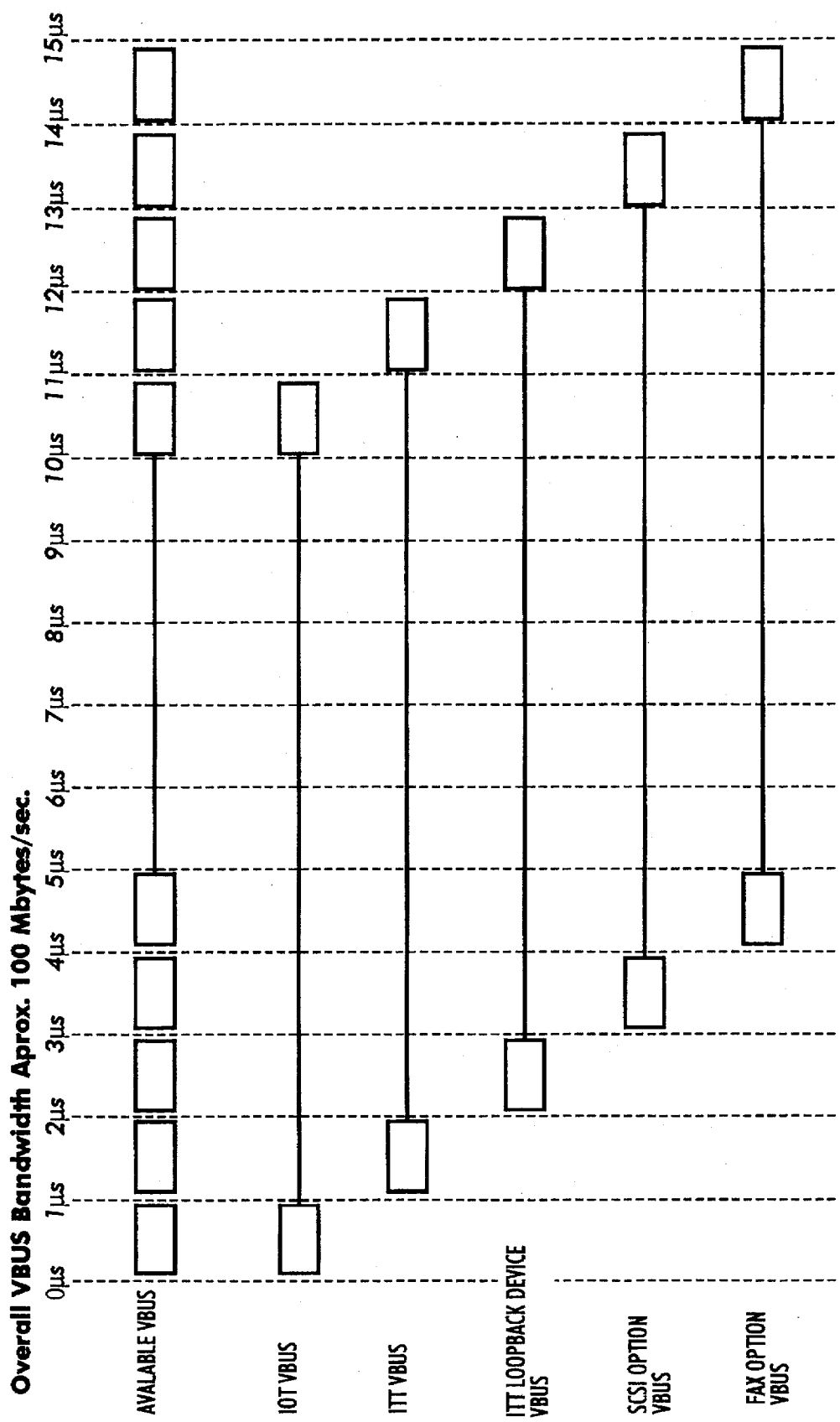
FIG. 8 is a timing diagram depicting a manner in which a plurality of bus masters can share a video bus, of the printing machine of FIG. 1, in a time-shared manner.

Referring to FIG. 8, another aspect of operation of the above described printing system is discussed. The illustrated timing diagram of FIG. 8 shows how each bus master on the Vbus 28 shares the available bandwidth by time multiplexing the high speed bus and sending a fragment of a job or image file every time the bus master has access to the bus. Each time one of the bus masters receives a grant of the bus, via the arbiter 70, the bus master sends a packet of information on the bus while it continues to receive data from its respective interface. Packet sizes are programmable in sizes ranging from 4 bytes to 64 bytes per packet. In the example of FIG. 8, each device requires approximately 10 Mbytes/sec of bandwidth from the Vbus. When bus masters, each having a bandwidth requirement of 10 Mbytes/sec, are concurrently using the bus, the total bandwidth used on the bus is 50 Mbytes/sec. This leaves approximately 50 Mbytes/sec available bandwidth left on the bus. The remaining bus bandwidth can be used by any other bus masters wishing to transfer data on the Vbus. The large amount of available bandwidth also eliminates any contention problems which can arise with an over-utilized bus.

Referring to both FIGS. 2 and 8, it will be appreciated that the above-described multiplexing permits at least two jobs to be processed within a relatively brief time interval. For all intents and purposes, it would appear to a printing system user that the jobs were being operated on simultaneously. More specifically, a first job could be stored in the EPC memory 24 and a second job could be stored in the host memory 74. As soon as an image data packet of the second job is buffered in the packet buffer of transfer module 36e, a packet of image data from the first job can be delivered to the printer 20, by use of transfer module 36d, concurrently with image data being delivered to the image processing section 22. As will be further appreciated, by reference to FIG. 8, copies of packets of the first job could be delivered to various other bus masters in a time-sharing or multiplexed fashion.

Figure 9:
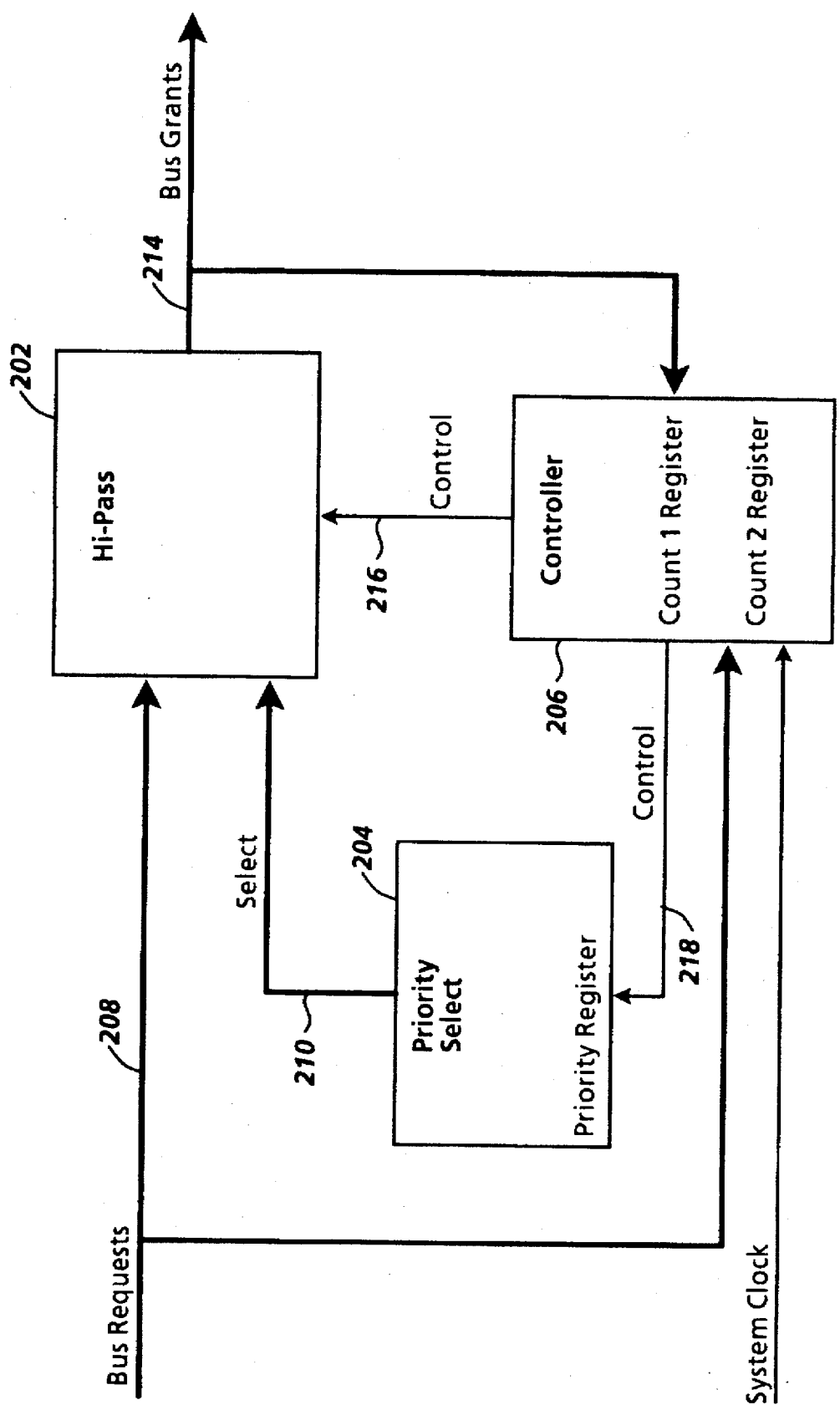
FIG. 9 is a block diagram of an arbiter used in the video control module of FIG. 2.

Referring now to FIG. 9, the VBus arbiter 70 is discussed in further detail. The VBus arbiter includes a hi-pass circuit 202, a priority select circuit 204 and a controller 206. As shown in the illustrated embodiment of FIG. 9, the hi-pass circuit 202 communicates with the bus masters of the printing system by way of a bus request bus 208 and receives select signals by way of a select bus 210. Additionally, the controller 206 is provided with feedback information, regarding incoming bus requests, from bus 208, and a currently latched bus grant, from a bus 214. Finally, the controller 206, which includes count registers, the significance of which will be discussed in further detail below, transmits control signals to the hi-pass circuit and priority select circuit by way of control lines 216 and 218, respectively.

Figure 10:
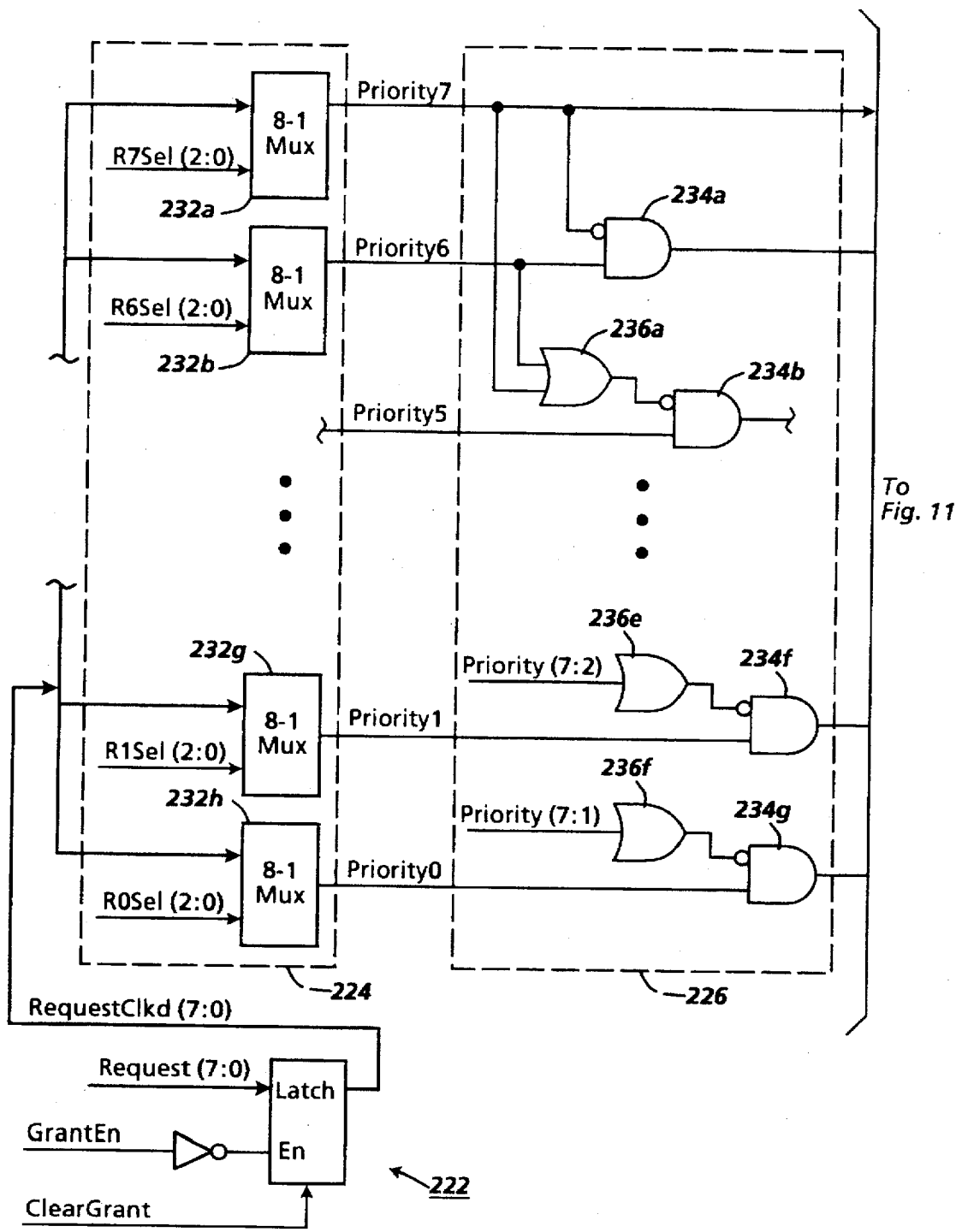
FIG. 10 is a schematic representation of a logical network used to implement a first part of a high-pass circuit in the arbiter of FIG. 9.

Referring specifically to FIG. 10, the hi-pass circuit 202 is discussed in further detail. The hi-pass circuit includes a first latch 222, a first steering circuit 224, a filtering circuit 226, a second steering circuit 228 and a second latch 230. More particularly, the steering circuit includes, in the illustrated embodiment of FIG. 10, eight N to 1 multiplexers designated by the numerals 232a, 232b, ... 232h. While the currently disclosed arbiter is constructed to accommodate eight bus masters, it will be appreciated that the disclosed implementation is readily scalable for more or less than eight bus masters. Each of the multiplexers 232 receives a select signal, from the priority select circuit, and each select signal defines which 8 bit bus request signal will cause a given multiplexer to output a high or low signal. It will be be appreciated that the functionality of the first steering circuit could be achieved with a wide variety of logical components other than a set of multiplexers.

The output of each multiplexer 232 is coupled with a priority line referred to in the form of "PriorityN". N of the priority lines are connected to respective and gates, designated by the numerals 234a, 234b, ... 234g, while N−1 of the priority lines are coupled with or gates, designated by the numerals 236a, 236b, ... 236g. The Priority7 line communicates with both multiplexer 238a and an inverted input of the and gate 234a. The Priority6 and Priority7 lines communicate with the or gate 236a, while the output of the or gate 236a and the Priority5 line communicate with the and gate 234b. The logical implementation used with the Priority (7:6) and Priority5 lines is applied similarly for each set of Priority (N:1,N−1) and Priority N−1 lines in the filtering circuit 226. For example, the Priority1 line is anded with the inverted output of or gate 236g, the or gate 236g communicating with all of the priority lines except the Priority0 and Priority1 lines.

At this time, the functionality of both the first steering circuit and the filtering circuit can be fully comprehended by way of a first example. In operation, request signals for up to eight bus masters are received at the first latch. As will appear, the first latch is not necessary for the suitable operation of hi-pass 202. Various three bit select signals, namely R0Sel (2:0), R1Sel (2:0), ... R7Sel (2:0) are set to map the priority paths with a selected bus master ordering. In the present first example of an eight bus master implementation, the bus masters are grouped in the following descending order: M0 (i.e. bus master 0), M2, M3, M5, M6, M4, M7 and M1. Accordingly, M0 is mapped with R7Sel (2:0), M2 is mapped with R6Sel (2:0), M3 is mapped with R5Sel (2:0) and so on. Additionally, each bus master is assigned a three bit value corresponding with its numerical indicator. For instance, M0 would correspond to 000, M2 to 010, M3 to 011 and so on.

In accordance with the present first example, the respective values of R7Sel (2:0), R6Sel (2:0), R5Sel (2:0), R4Sel (2:0), R3Sel (2:0), R2Sel (2:0), R1Sel (2:0) and R0Sel (2:0) would be 000, 010, 011, 101, 110, 100, 111 and 001. For a case in which M0, M3 and M7 sought access the VBus 28 simultaneously, the respective request signals for M0, M3 and M7 would be steered to multiplexers 232a, 232c and 232g. While each of the Priority1, Priority5 and Priority7 lines are activated, with a 1, only the request signal for M0 is permitted to pass through filtering circuit 226. This is because an active signal will appear at each of or gates 236a–236f and cause the corresponding and gates 234b–234g to output a low signal.

Figure 11:
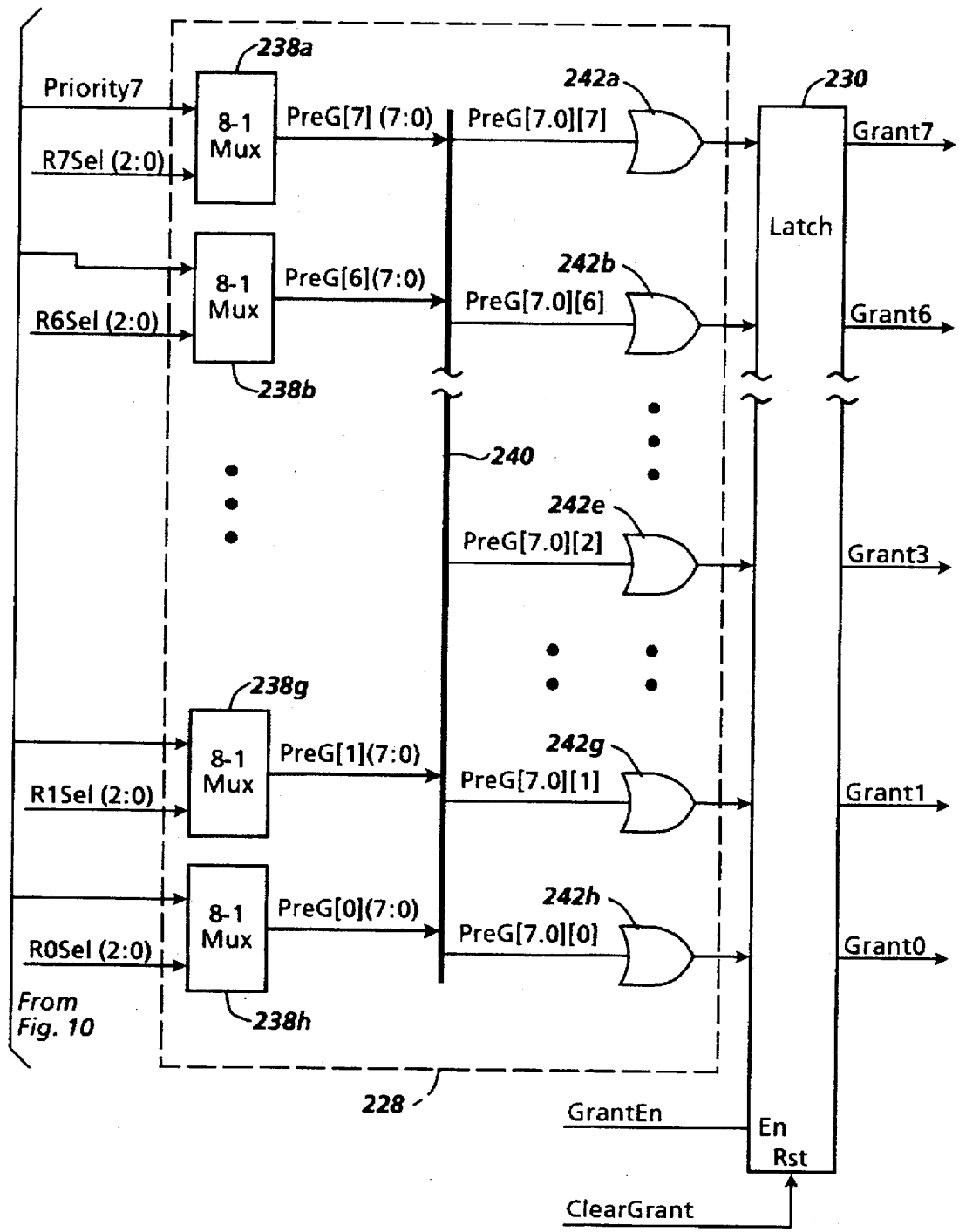
FIG. 11 is a schematic representation of a logical network used to implement a second part of the high-pass circuit in the arbiter of FIG. 9.

Referring to FIGS. 10 and 11, the outputs of the and gates 234a–234g are directed respectively to the second steering circuit 228, or, more specifically to eight 1 to N multiplexers 238a, 238b, ... 238h. In the illustrated embodiment of FIG. 11, each multiplexer 238 forms an eight bit word, based on the state of its respective priority line, which, in turn, is transmitted to a 64 bit wide bus 240. Each bit of each 8 bit word is then transmitted, along a unique line of the bus 240 to a unique one of a plurality of or gates 242a, 242b, ... 242h. Preferably, the eight bits associated with the Priority7 line are transmitted to the eight or gates in an order starting from the least or most significant bit, the eight bits associated with the Priority6 line are transmitted to the eight or gates in a similar order and so on for the other priority lines. In the above first example, with the Priority7 line active, the word 00000001 would be formed. A 1 would be transmitted to or gate 242h while 0s would be transmitted to all the other gates 242. Additionally, no gate, except for or gate 242h, would receive a 1 since each word from the multiplexers 238b–238h would be 00000000.

The outputs of the or gates 242 are communicated to the second latch 230. The outputs of the or gates 242 correspond with a selected bus order, which, in the first example follows a descending order starting with bus master 7 (i.e. M7). In the illustrated embodiment of FIG. 11, the output of or gate 242a is mapped to a grant signal for M7, the output of the or gate 242b is mapped to the grant signal for M6 and so on. In the above first example, the only active signal was obtained from or gate 242h, via the least significant bit of 00000001, so a bus grant signal for M0, namely Grant0 is latched and held active until a bus cycle for M0 is complete. In a second example, M0 would relinquish the bus and the request signals for M3 and M7 would still be active. At this time, the word 00000100 would be developed at multiplexer 238c. In turn, the 1 from the third least significant bit would show up at the or gate 242f so that Grant3 would be latched.

Referring back to the functionality of latch 222, this component is provided to avoid "race" conditions. For instance, in the above first example, a request for M2 could arrive at the hi-pass 202 just as the second latch is ready to latch Grant3. Depending on the throughput rate of the circuits 224, 226 and 228, the request for M2 could just "beat out" the request for M3. This sort of race condition may be eliminated by "throttling" the request signals, with the latch 222, as the second latch is about to latch a request signal. In another example, the first latch 222 could be eliminated by specifying a set-up time on the request lines.

Preferably, the first latch 222 serves a second purpose, namely to prevent request signals from accessing the first steering circuit 224 while a grant signal is enabled. In particular, referring to FIGS. 10-12, the controller 206, which communicates with the second latch 230, includes controller logic 246. Pursuant to latching a grant signal, the controller logic transmits a grant enable signal (GrantEn) to the first latch 222 and the second latch 230. The grant enable signal is inverted at the first latch 222, however, so that incoming request signals are blocked thereat. As a bus master relinquishes the VBus, the controller logic detects the accessibility of the VBus and transmits a ClearGrant signal to both the first and second latches so that another grant signal can be latched.

Figure 12:
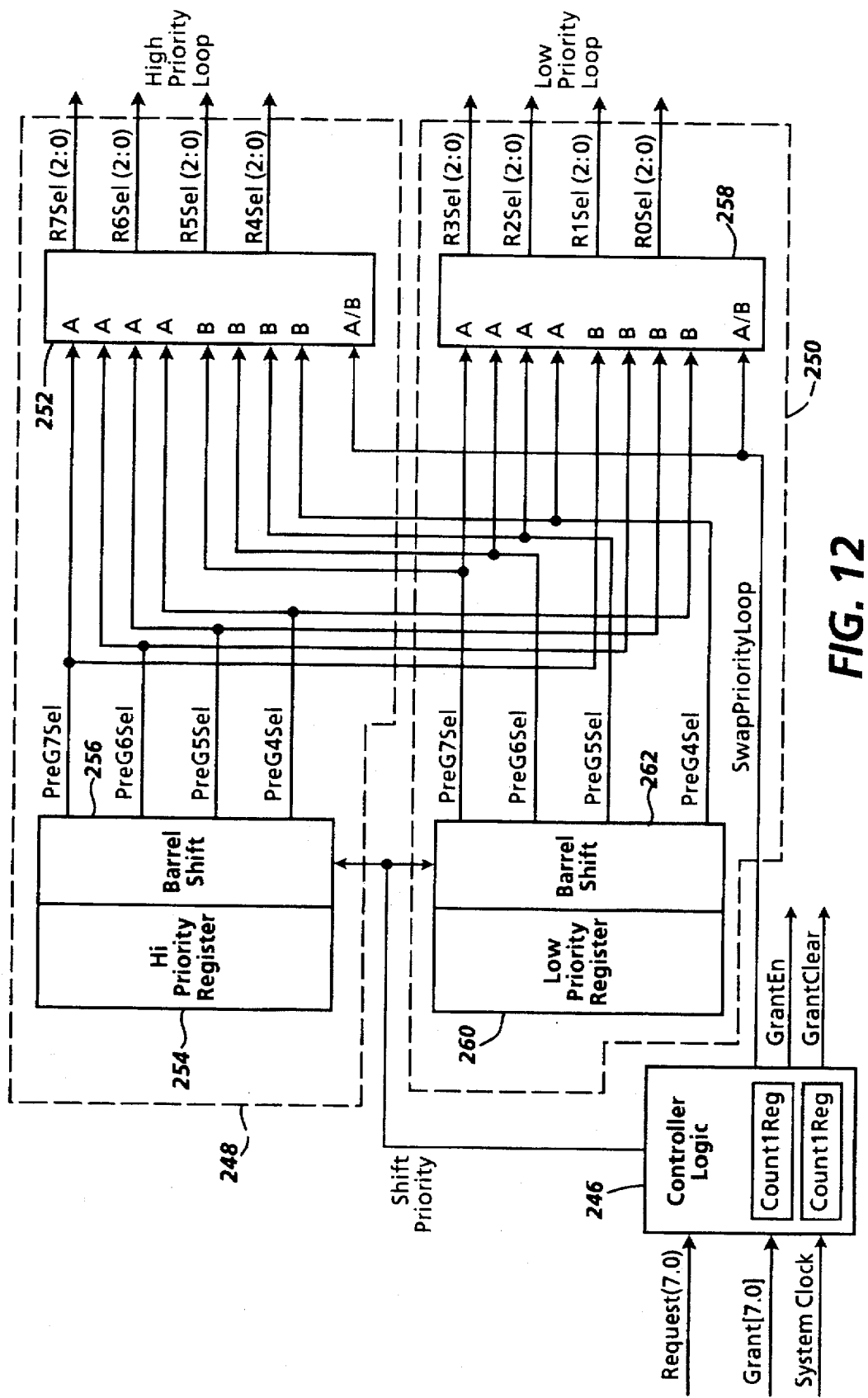
FIG. 12 is a schematic representation of a logical network used to implement priority select and controller circuits in the arbiter of FIG. 9.

Referring to FIG. 12, the process of generating select signals for the first steering circuit 224 is discussed in further detail. The illustrated priority select circuit 204 includes a first priority select signal generating circuit 248 and a second priority select signal generating circuit 250. In practice, the circuits 248, 250 are identical in structure and the first circuit 248 is normally given a higher priority than the second circuit 250. The first circuit 248 includes a first bank of 2:1 multiplexers 252 operatively coupled with both a first register 254 and a first barrel shifter 256. The second circuit 250 includes a second bank of 2:1 multiplexers 258 operatively coupled with both a second register 260 and a second barrel shifter 262. As shown, each multiplexer bank includes a set of "A" inputs and a set of "B" inputs. Preferably, the controller logic 246 provides a high signal (e.g. a "1") or a low signal (e.g. a "0"), via a SwapPriorityLoop line, to an input designated by the notation A/B(Sub-Bar) indicating that the A inputs are activated with a 1 and the B inputs are activated with a 0. While the first circuit 248 is preferably given priority over the second circuit 250, circuit priority can be reversed by simply shifting the state of the signal to the A/B(Sub-Bar) input.

In one example, four three bit signals, corresponding respectively to four bus masters, are stored in each of the registers 254, 260 in a preselected order. As will be appreciated, the number of registers can be scaled readily so that signals for more than eight bus masters can be developed. Preferably, the order of the bus master related signals may be selectively shifted, in at least one of the registers, during a period in which the GrantEn signal is active, so that the priority select circuit operates in a dual "round robin" fashion. This shifting is accomplished through use of a Shift Priority line. In one example, as will appear below, the order of the signals in at least one of the registers is repositioned by alternating the state of the signal across the Shift Priority line. Additionally, the outputs of the barrel shifters are designated in the form of PreGNSel (Y:0) and the outputs of the multiplexer banks are designated in the form RNSel (Y:0), where, in one example, N=0:7 and Y=2.

Operation of the priority select circuit 204 can be understood by way of a second example that parallels the above-described first example. In the second example, signals for the bus masters M0, M2, M3 and M5 are loaded initially into the first register 254 so that PreG7Sel (2:0), PreG6Sel (2:0), PreG5Sel (2:0) and PreG4Sel (2:0) are 000, 010, 011 and 101, respectively. Additionally, M6, M4, M7 and M1 are loaded initially into the second register 260 so that PreG3Sel (2:0), PreG2Sel (2:0), PreG1Sel (2:0) and PreG0Sel (2:0) are 110, 100, 111 and 001, respectively. Assuming that a 1 is transmitted across the SwapPriorityLoop line, then the signals across PreG7Sel (2:0), PreG6Sel (2:0), PreG5Sel (2:0), PreG4Sel PreG3Sel (2:0), PreG2Sel (2:0), PreG1Sel (2:0) and PreG0Sel (2:0) are transmitted to $A_7$, $A_6$, $A_5$, $A_4$, $A_3$, $A_2$, $A_1$ and $A_0$, respectively. In turn the three bit words corresponding to $A_7$, $A_6$, $A_5$, $A_4$, $A_3$, $A_2$, $A_1$ and $A_0$ are conveyed to R7Sel (2:0), R6Sel (2:0), R5Sel (2:0), R4Sel (2:0), R3Sel (2:0), R2Sel (2:0), R1Sel (2:0) and R0Sel (2:0), respectively. It should be appreciated that when a 1 is transmitted across the SwapPriorityLoop line, the four bus master signals of the first register 254 are mapped to select signals having a higher priority than the resulting select signals of the four bus master signals of the second register 260.

On the other hand, if a 0 is transmitted across the SwapPriorityLoop line, then the signals PreG3Sel (2:0), PreG2Sel (2:0), PreG1Sel (2:0) and PreG0Sel (2:0) are transmitted to $B_7$, $B_6$, $B_5$, $B_4$, respectively, while the signals PreG7Sel (2:0), PreG6Sel (2:0), PreG5Sel (2:0) and PreG4Sel (2:0) are transmitted to $B_3$, $B_2$, $B_1$, $B_0$, respectively. In turn, the three bit words corresponding to $B_7$, $B_6$, $B_5$, $B_4$, $B_3$, $B_2$, $B_1$ and $B_0$ are conveyed to R7Sel (2:0), R6Sel (2:0), R5Sel (2:0), R4Sel (2:0), R3Sel (2:0), R2Sel (2:0), R1Sel (2:0) and R0Sel (2:0), respectively. It should be appreciated that when a 0 is transmitted across the SwapPriorityLoop line, the four bus master signals of the second register 260 are mapped to select signals having a higher priority than the resulting select signals of the four bus master signals of the first register 254.

Referring still to FIG. 12, the controller logic 246 includes a first count register (Count1 Reg) and a second count register (Count2 Reg). The first count register keeps track of how many consecutive times the bus masters of the first register 254 are granted access to the VBus 28 (FIG. 2), while the second count register keeps track of how many consecutive times the bus masters of the second register 260 are granted access to the VBus. Preferably, the controller logic uses the count registers to control both the Shift Priority and the SwapPriorityLoop lines. In one instance, the controller logic will cause a swap of the registers 254, 260 after a preselected number of bus masters of the first register 254 have been granted access to the VBus. Conversely, after a preselected number of the bus masters of the second register 260 have been granted access to the VBus, the controller logic will swap the registers again, provided a low priority request is pending. Additionally, the count registers can be used to program shift timing of the respective bus master related signals of the registers 254 and 260.

Figure 13:
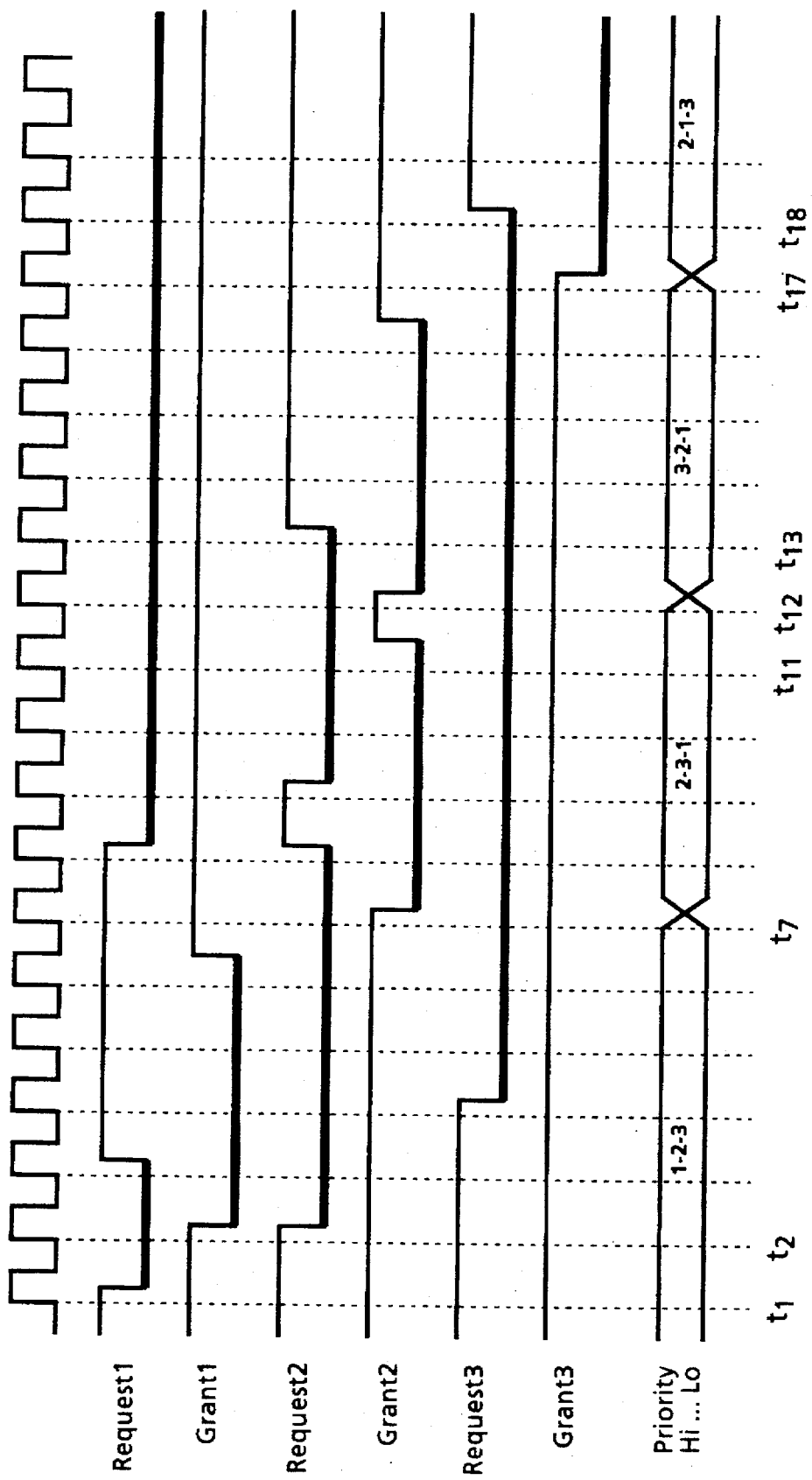
FIG. 13 is an exemplary timing diagram for the arbiter of FIG. 9.

Referring to FIG. 13, the technique of the preferred embodiment is illustrated by way of a timing diagram in which requests for three bus masters, whose related priority signals reside in, for example, the first register 254 are arbitrated. It will be noted that for the example of FIG. 13, requests and grants are expressed in terms of active lows. This is in contrast to the discussion above which placed an emphasis on the use of active highs. As will be appreciated by those skilled in the art, the logical implementation of the currently disclosed embodiment could be implemented with active highs or active lows without affecting the principles upon which the preferred embodiment is based. For purposes of relating the illustrated embodiment of FIG. 13 to a third example request 1 corresponds to a request from M0, request 2 corresponds to a request from M1, request 3 corresponds to a request from M2, while M0, M1 and M2 are loaded into the register 254 in descending order. Referring specifically to FIG. 13, M0 requests the bus after $t_1$ and after $t_2$, M0 is granted the VBus, via Grant1. It should be recognized that since Grant1 is latched at the second latch 230 (FIG. 11), M0 need not continue its request (i.e. Request1) once Grant1 becomes active.

After Grant1 becomes inactive, the request for M2, namely Request2 is granted just after $t_7$. The request for M2 is serviced at this time because there is no pending request for M0, which has the highest current priority, and Request2 has current priority over Request3. As soon as Request2 is granted, via Grant2, the positions of the related priority signals in the first register 254 are reordered, in round robin fashion, so that M0 is shifted to the lowest priority position while M2 and M3 are moved up to the first and second priority positions, respectively. At $t_{11}$, Grant2 becomes inactive and, after $t_{12}$, Grant2 becomes active again since M2 had priority at $t_{12}$. As Grant2 issues, between $t_{12}$ and $t_{13}$, the priorities of the related priority signals, in the first register 254, are repositioned in round robin fashion. Between $t_{17}$ and $t_{18}$, M3 is finally given access to the VBus and the priorities of the related priority signals are repositioned again.

Numerous features of the presently disclosed embodiment will be appreciated by those skilled in the art:

One feature of the disclosed embodiment is a filtering circuit in which a plurality of bus request signals, corresponding respectively with a plurality of bus masters, are steered respectively to a plurality of priority paths in accordance with generated select signals. Preferably, only the bus request signal corresponding with the highest priority path is permitted to pass through the filtering circuit. The bus request signal that passes through is related to a bus grant signal, which bus grant signal is then latched for use in granting the bus master, associated with the signal corresponding with the highest priority path, access to a video bus. As a result of filtering, arbitration for a plurality of incoming bus request signals can be obtained within a relatively short time interval without latching the request signals. Moreover, since the bus grant signal is latched, there is no need to continue transmission of the signal, corresponding with the highest priority path to the filtering circuit.

Another feature of the disclosed embodiment is that a priority select circuit controls the manner in which the bus request signals are steered to the priority paths. More particularly, signals, relating to each bus master in the system, are loaded into one or more registers and the outputs of the registers are used, in conjunction with a logically based apparatus, to generate a plurality of select signals. In turn, these select signals control the steering process. In one example, a first set of bus master related signals is loaded into a first register and a second set of bus master related signals is loaded into a second register. Preferably, one of the registers is given priority over the other register. Each register can be used in conjunction with a barrel shifting device so that the registers can be employed to implement a dual "round-robin" scheme. The shifting of the registers need not delay operation of the arbiter since it can be achieved during an off-period while a bus master is accessing the video bus, i.e, while a bus grant signal is latched. As should be appreciated, through use of registers and barrel shifters many bus master priority schemes can be provided, during a relatively brief time period, without incurring high memory overhead. Since the amount of memory overhead is kept to a reasonable minimum, the arbiter can be implemented readily on an ASIC.

Yet another feature of the disclosed embodiment is that a controller synchronizes operation of the filtering and priority select circuits. In one preferred aspect of operation, the controller essentially "shuts down" the filtering circuit when a bus grant signal is latched. At the same time, as soon as the bus grant signal is released, the controller permits bus request signals to be inputted to the filtering circuit. In another preferred aspect of operation, in which the first register is a high priority register and the second register is a low priority register, the controller insures that the bus masters associated with the low priority register are not "locked out" of access to the video bus. To prevent lock-out, the controller keeps track of how many times bus masters, associated with the high priority register, are given access to the video bus. After a preselected number of times, the controller switches priority of the registers so that a selected number of bus masters associated with the low priority register are able to access the bus.

What is claimed is:

1. A printing system for storing or outputting a job, the job being represented by a set of image signals with the set of image signals being transferred across a video bus, comprising:

a first bus master, communicating with the video bus, for transmitting or receiving one or more segments of the job, said first bus master seeking access to the video bus with a first bus request signal;

a second bus master, communicating with the video bus, for transmitting or receiving one or more segments of the job, said second bus master seeking access to the video bus with a second bus request signal; and an arbiter, communicating with both said first bus master and said second bus master, for determining an order in which said first bus master and said second bus master are to access the video bus when each of said first bus master and said second bus master seeks access to the video bus simultaneously, said arbiter including:

a filtering circuit, communicating with both said first bus master and said second bus master, said filtering circuit permitting only a selected one of the first bus request signal and the second bus request signal to pass therethrough, and a bus grant circuit, operatively coupled with said filtering circuit, for issuing a first bus grant signal when receiving the first bus request signal, or a second bus grant signal, when receiving the second bus request signal, the first bus grant signal being used to obtain access to the video bus for said first bus master and the second bus grant signal being used to obtain access to the video bus for said second bus master.

2. The printing system of claim 1, wherein a first logical device is disposed in said first line and a second logical device is disposed in said second line, said first logical device permitting the selected one of the first bus request signal and the second bus request signal to be transmitted along the first line to said bus grant circuit and said second logical device prohibiting the other selected one of the first bus request signal and the second bus request signal from being transmitted along said second line to said bus grant.

3. A printing system for storing or outputting a job, the job being represented by a set of image signals with the set of image signals being transferred across a video bus, comprising:

a first bus master, communicating with the video bus, for transmitting or receiving one or more segments of the job, said first bus master seeking access to the video bus with a first bus request signal;

a second bus master, communicating with the video bus, for transmitting or receiving one or more segments of the job, said second bus master seeking access to the video bus with a second bus request signal; and an arbiter, communicating with both said first bus master and said second bus master, for determining an order in which said first bus master and said second bus master are to access the video bus when each of said first bus master and said second bus master seeks access to the video bus simultaneously, said arbiter including, a filtering circuit, communicating with both said first bus master and said second bus master, said filtering circuit including a first line with a first priority and a second line with a second priority, with the first priority being higher than the second priority, wherein said filtering circuit permits only a selected one of the first bus request and the second bus request to pass therethrough, and said filtering circuit includes a circuit for steering the selected one of the first bus request signal and the second bus request signal to the first line, and a bus grant circuit, operatively coupled with said filtering circuit, for issuing a first bus grant signal when receiving the first bus request signal, or a second bus grant signal, when receiving the second bus request signal, the first bus grant signal being used to obtain access to the video bus for said first bus master and the second bus grant signal being used to obtain access to the video bus for said second bus master.

4. The printing system of claim 3, wherein:

said steering circuit includes a logical component arrangement having a first logical device, operatively coupled with the first line, and a second logical device, operatively coupled with the second line, the first logical device; and in response to receiving a select signal, said steering circuit permits the selected one of the first bus request signal and the second bus request signal to be transmitted along the first line to said bus grant circuit.

5. The printing system of claim 4, further comprising a circuit, communicating with said filtering circuit for generating the select signal.

6. The printing system of claim 5, wherein said generating circuit includes a first register in which a first priority signal, relating to the first bus master, and a second priority signal, relating to the second bus master, reside in a preselected positional order with the first priority signal being assigned a priority that is higher than that of the second priority signal.

7. The printing system of claim 6, wherein:

said generating circuit includes a shifting device, operatively coupled with said first register for selectively alternating the positional order of the first priority signal and the second priority signal; and when the first priority signal is positioned ahead of the second priority signal, the first bus master is given access to the video bus prior to the second bus master.

8. The printing system of claim 6, further comprising a third bus master which transmits a third bus request signal when seeking access to the video bus wherein said generating circuit includes a second register with a third priority signal relating to the third bus master.

9. The printing system of claim 8, in which said first register and said second register are assigned a first usage priority and a second usage priority, respectively, wherein, in a first mode, the first usage priority is higher than the second usage priority so that respective bus request signals issued by said first bus master and said second bus master are permitted to pass through said filtering circuit prior to a third bus request signal issued by the third bus master.

10. The printing system of claim 9, wherein in a second mode, the second usage priority is higher than the first usage priority so that a third bus request signal issued by the third bus master is permitted to pass through said second circuit prior to either a first bus request bus signal issued by the first bus master or a second bus request issued by the second bus master.

11. The printing system of claim 10, further comprising a controller, communicating with said generating circuit, for controlling enablement of the first mode or the second mode.

12. The printing system of claim 3, in which said bus grant circuit includes an arrangement of logical devices functioning cooperatively to steer the selected one of the first bus request signal and the second bus request signal to a selected one of the first bus grant signal and the second bus grant signal.

13. The printing system of claim 3, further comprising a controller, communicating with said bus grant circuit, for controlling a latching of whichever one of the first bus grant signal and the second bus grant signal is issued by said bus grant circuit, wherein, upon latching the issued one of the first bus grant signal and the second bus grant signal, a need to continue filtering bus request signals is eliminated.

14. The printing system of claim 13, in which said controller communicates with said filtering circuit, wherein said controller transmits a grant enable signal to said filtering circuit for preventing bus request request signals from being inputted to said filtering circuit while the issued one of the first bus grant signal and the second bus grant signal is being latched.

15. An arbitrating apparatus for controlling which one of a first bus master and a second bus master accesses a video bus when the first bus master, by way of a first bus request signal transmitted by the first bus master, an the second bus master, by way of a second bus request signal transmitted by the second bus master, seek access to the video bus simultaneously comprising:

a first bus and a second bus for respectively transmitting the first bus request signal and the second bus request signal thereacross;

a filtering circuit, operatively coupled with said first bus and said second bus, said filtering circuit including a first line with a first priority and a second line with a second priority, with the first priority being higher than the second priority wherein said filtering circuit permits only a selected one of the first bus request signal and the second bus request signal to pass therethrough, and said filtering circuit includes a circuit for steering the selected one of the first bus request signal and the second bus request signal to the first line; and a bus grant circuit, operatively coupled with said filtering circuit, for issuing a first bus grant signal, when receiving the first bus request signal, or a second bus grant signal, when receiving the second bus request signal, the first bus grant signal being used to obtain access to the video bus for the first bus master and the second bus grant signal being used to obtain access to the video bus for the second bus master.

16. The arbitrating apparatus of claim 15, wherein:

said steering circuit includes a logical component arrangement having a first logical device, operatively coupled with the first line, and a second logical device, operatively coupled with the second line, the first logical device; and in response to receiving a select signal, said steering circuit permits the selected one of the first bus request signal and the second bus request signal to be transmitted along the first line to said bus grant circuit.

17. The arbitrating apparatus of claim 16, further comprising a circuit, communicating with said filtering circuit for generating the select signal.

18. The arbitrating apparatus of claim 17, wherein said generating circuit includes a first register in which a first priority signal, relating to the first bus master, and a second priority signal, relating to the second bus master, reside in a preselected positional order with the first priority signal being assigned a priority that is higher than that of the second priority signal.

19. The arbitrating apparatus of claim 18, wherein:

said generating circuit includes a shifting device, operatively coupled with said first register for selectively alternating the positional order of the first priority signal and the second priority signal; and when the first priority signal is positioned ahead of the second priority signal, the first bus master is given access to the video bus prior to the second bus master.

20. The arbitrating apparatus of claim 19, in which the selected one of the first bus request signal and the second bus request signal is latched by said bus grant circuit during a selected interval, further comprising a controller, communicating with said filtering circuit, for transmitting a grant enable signal to said bus grant circuit, during the selected interval over which the selected one of the first bus grant signal and the second bus grant signal is latched by said bus grant circuit, said controller controlling an alternation of the positional order of the first priority signal and the second priority signal while the grant enable signal is active.

21. The arbitrating apparatus of claim 18, further comprising a third bus master which transmits a third bus request signal when seeking access to the video bus wherein said generating circuit includes a second register with the third bus master being disposed therein.

22. The arbitrating apparatus of claim 21, in which said first register and said second register are assigned a first usage priority and a second usage priority, respectively, wherein, in a first mode, the first usage priority is higher than the second usage priority so that respective bus request signals issued by the first bus master or the second bus master is permitted to pass through the filtering circuit prior to a third bus request signal issued by the third bus master.

23. The arbitrating apparatus of claim 22, wherein in a second mode, the second usage priority is higher than the first usage priority so that a third bus request signal issued by the third bus master is permitted to pass through said second circuit prior to either a first bus request bus signal issued by the first bus master or a second bus request issued by the second bus master.

24. The arbitrating apparatus of claim 23, further comprising a controller, communicating with said generating circuit, for controlling enablement of the first mode or the second mode.

25. The arbitrating apparatus of claim 15, wherein a first logical device is disposed in said first line and a second logical device is disposed in said second line, said first logical device permitting the selected one of the first bus request signal and the second bus request signal to be transmitted along the first line to said bus grant circuit and said second logical device prohibiting the other selected one of the first bus request signal and the second bus request signal from being transmitted along said second line to said bus grant circuit.

26. The arbitrating apparatus of claim 15, in which said bus grant circuit includes an arrangement of logical devices functioning cooperatively to steer the selected one of the first bus request signal and the second bus request signal to a selected one of the first bus grant signal and the second bus grant signal.

27. The arbitrating apparatus of claim 15, further comprising a controller, communicating with said bus grant circuit, for controlling a latching of whichever one of the first bus grant signal and the second bus grant signal is issued by said bus grant circuit, wherein, upon latching the issued one of the first bus grant signal and the second bus grant signal, a need to continue filtering bus request signals is eliminated.

28. The arbitrating apparatus of claim 27, in which said controller communicates with said filtering circuit, wherein said controller transmits a grant enable signal to said filtering circuit for preventing bus request signals from being inputted to said filtering circuit while the issued one of the first bus grant signal and the second bus grant signal is being latched.

29. A method for arbitrating an order in which a first bus master and a second bus master are to access the video bus when each of the first bus master and said second bus master seeks access to the video bus simultaneously, said method comprising:

transmitting a first bus request signal from the first bus master, to a filtering circuit, for seeking access, with the first bus master, to the video bus;

transmitting a second bus request signal from the second bus master, to the filtering circuit, for seeking access, with the second bus master, to the video bus;

filtering the first bus request signal and the second bus request signal, with the filtering circuit, so that a selected one of the first bus request signal and the second bus request signal is permitted to pass through the filtering circuit;

issuing a first bus grant signal when receiving the first bus request signal at a bus grant circuit, or a second bus grant signal, when receiving the second bus request signal at the bus grant circuit, the first bus grant signal being used to obtain access to the video bus for the first bus master and the second bus grant signal being used to obtain access to the video bus for the second bus master; and transmitting a first select signal or a second select signal to the filtering circuit for designating which one of the first bus request signal and the second bus request signal is to pass through the filtering circuit.

30. The method of claim 29, further comprising the step of generating the first and second select signals with a generating circuit.

31. The method of claim 30, in which the first select signal is responsive to a first priority signal disposed in a first register of the generating circuit and the second select signal is responsive to a second priority signal disposed in a second register of the generating circuit, further comprising the step of shifting between the first and second registers for generating the first select signal or the second select signal.

\* \* \* \* \*